Figure 1:
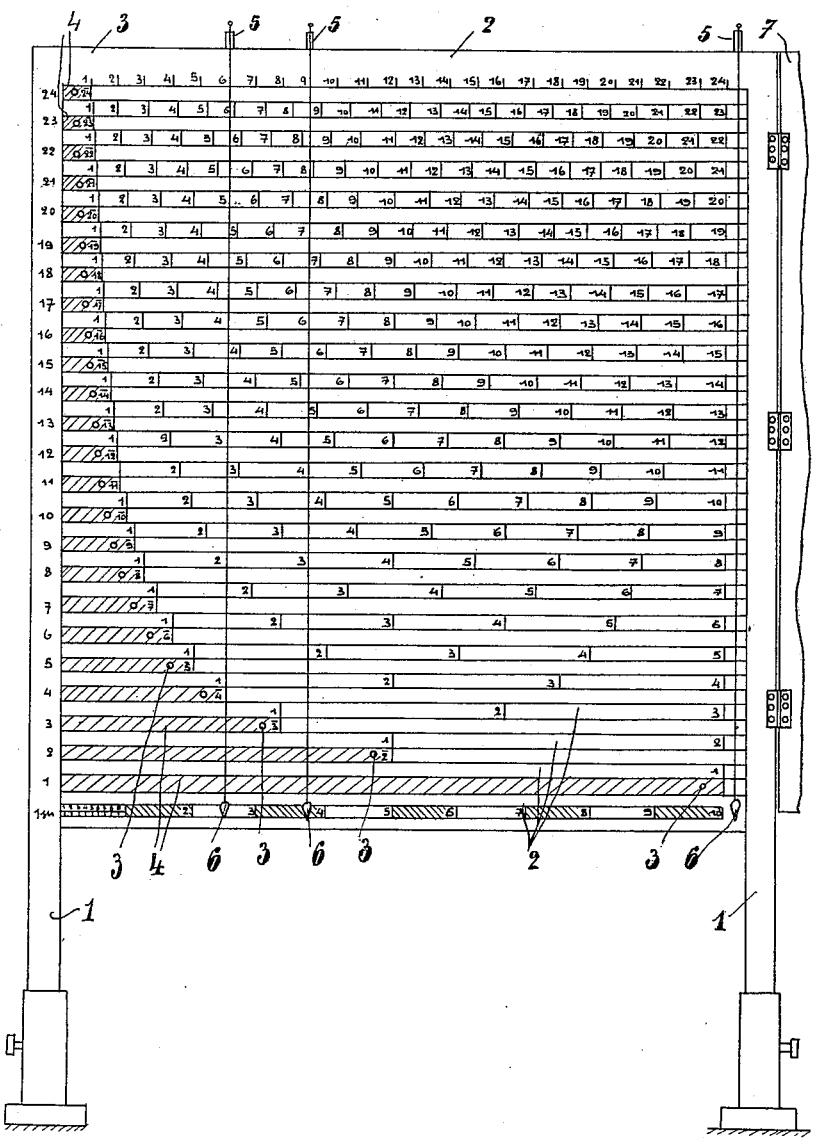

I. PANNENKOWA.
DEVICE FOR TEACHING FRACTIONS.
APPLICATION FILED MAY 13, 1912.

1,098,330.

Patented May 26, 1914.
2 SHEETS—SHEET 1.

I. PANNENKOWA.
DEVICE FOR TEACHING FRACTIONS.
APPLICATION FILED MAY 13, 1912.
1,098,330.
Patented May 26, 1914.
2 SHEETS—SHEET 2.
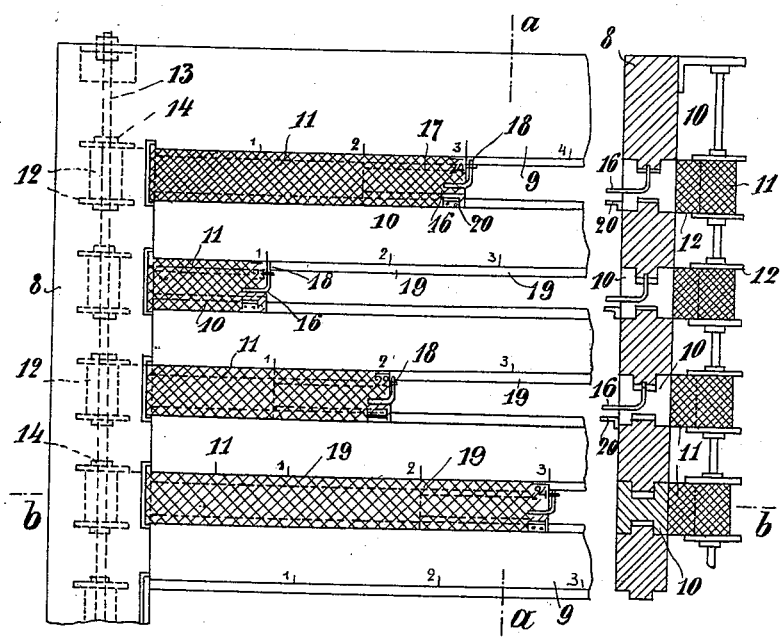
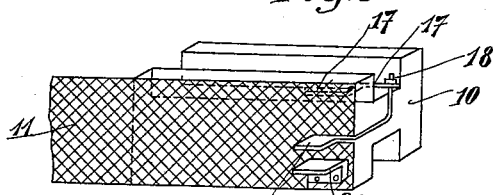

UNITED STATES PATENT OFFICE.

IRENA PANNENKOWA, OF LEMBERG, AUSTRIA-HUNGARY, ASSIGNOR OF ONE-HALF TO TADEUSZ PANNENKO, OF LEMBERG, AUSTRIA-HUNGARY.

DEVICE FOR TEACHING FRACTIONS.

1,098,330.  Specification of Letters Patent.  Patented May 26, 1914.

Application filed May 13, 1912. Serial No. 697,102.

*To all whom it may concern:*

Be it known that I, IRENA PANNENKOWA, a subject of the Emperor of Austria-Hungary, residing at 14 Pulaskiego, Lemberg, Galicia, Austria-Hungary, have invented certain new and useful Improvements in Devices for Teaching Fractions, of which the following is a specification.

This invention relates to devices used for facilitating the instruction of pupils in the principles and operations of arithmetic, and has for object a device whereby a teacher will be able to explain to the pupils not only the significance of numerators and denominators and the correct way to read and write down fractions, but also the principles of the simplification of fractions, the bringing of the same to a common denominator, and the working out of all operations with fractions.

The invention consists in an improved device for the above purpose, in which sliding plates the lengths of which are proportional to the values of consecutive fractions 1/1, 1/2, 1/3, 1/4, 1/5, and so forth, are arranged between parallel battens mounted in a frame, on which battens a unit length is marked off and divided into as many parts as there are units in the denominator of the fraction represented by the batten. The division marks of the battens are numbered with the values of the numerators, and the slide plates with the values of the denominators of the fraction to be represented, and plummets are slidingly mounted along the battens so as to act as cursors. These plummets serve to indicate the distances between the marks on consecutive slides with respect to a mark with which one of the plummets is in coincidence.

In one modification of the device bands or tapes working on spring reels or rollers are attached to the sliding plates and operate in such manner that the length of band exposed between the zero of the divisions and the sliding plate gives a visible indication of the ratio of the fraction to unity. In another modification the sliding plates are eliminated and replaced by endless bands on which are made prominent lengths equal to those of the plates so replaced.

The accompanying drawings illustrate by way of example three constructional forms of the device according to the invention, in which—

Figure 1 is an elevation of the first construction. Fig. 2 a partial elevation of the second construction. Fig. 3 a sectional elevation at the line *a—a* of Fig. 2. Fig. 4 a horizontal section at the line *b—b* of Fig. 2. Fig. 5 a detail view showing a slide plate with the end of the band attached thereto and its fixing device.

Between two vertical standards 1, the height of which is preferably adjustable in hollow feet and capable of being fixed as desired by means of pinching screws, are arranged a number of battens or strips 2 at equal distances apart, the uppermost and lowermost of which are preferably broader than the others so that along with the uprights they form a stiff rectangular frame. On the bottom batten 2 is marked off the unit, which for example may be a length of 1 meter, shown in the drawings as divided into decimeters and centimeters. On the next lowest batten and on all the others, the unit is also marked, the division marks determining the right hand ends of these unit lengths, being consecutively denoted by 1, 2, 3, 4, etc., . . . 24. On each batten the unit is divided into as many parts as the units contained in the number at the right hand end. For example the uppermost batten is divided into 24 parts. The first division line has the reference figure 1, and the following division lines are numbered consecutively 2, 3, etc., . . . 23. The figures on each batten 2 are the numerators of the fractions pertaining to each batten.

Between each two battens 2 is slidingly arranged a plate 4 provided with a knob 3. At the right hand end of the sliding plate is a figure corresponding to the number of the last division mark on the batten to which the plate appertains. The plates 4 reckoning upward, are thus provided with reference figures 1, 2, etc., . . . 24. These figures are the denominators of the fractions to be dealt with by each batten. The same figures are also marked on the left hand upright 1 at the level of the corresponding plates. If for example the fraction 4/13 is to be represented, the slide plate bearing the number 13 is moved to the right until its right hand end comes underneath the division mark 4 of the batten immediately above the plate. The fraction is then shown in the form in which it is to be written down so that the pupils learn with ease how every fraction should be written.

The slide plates 4 are preferably given hatching lines of different colors.

On the topmost batten 2 are arranged guide members 5 on which are suspended plummets 6 which enable the values of the fractions represented by the different battens to be compared with each other, and on carrying out different operations serve to determine any desired positions on the battens.

A plain blackboard 7 is preferably hinged to the frame.

It is clear that with the aid of the hereinbefore described device a teacher will be able to explain to the pupils not only the significance of numerators and denominators and the correct way to read and write down fractions, but also the principles of the simplification of fractions, the bringing of the same to a common denominator, and the working out of all operations with fractions. The above described device has however the drawback that when a slide plate corresponding to a certain fraction is set to the numerator of the fraction as denoted by the corresponding division mark of the guide batten, owing to the gap left on the left hand side of the slide plate, no visible impression is given of the ratio of the value of the fraction to unity. This drawback is obviated by the embodiment of the invention shown in Figs. 2, 3, 4, and 5, in which each slide plate is connected to the zero position of the division by a band which covers the space between the zero division and the temporary position of the slide plate, so that the visible length of this band clearly represents the ratio of the value of the fraction to unity. In the same way as in the first described device, there are arranged between the uprights 8, battens 9 having divisions corresponding to the numerators and between these battens slide plates 10 bearing numbers corresponding to the denominators. These slides 10 are attached to bands 11 of any desired material, which when the slide plate is set to the division mark corresponding to the numerator of the fraction, covers the space between the guiding battens extending from this division mark to the zero mark, thus clearly indicating the value of the fraction in ratio to unity or to another fraction. The bands 11 may for example be attached to reels or drums 12 and be wound on the same, these reels being each loosely journaled on a fixed pin 13 between collars 14, and connected to the pin by a spring 15 which holds the band tensioned when the slide is moved to the right and restores the slide to the zero position when it is released.

To allow the slide plates to be secured in any desired position, any suitable locking device may be provided. In the present construction lugs 16 mounted in the slide plates are provided, which lugs are attached to the end of springs 17 and have pins 18 at the top, which spring into holes 19 in the battens. To set a slide plate to any position the lug 16 is pressed against a stop 20 attached to the slide plate. In this construction as already stated the drawback of the first construction is removed, that owing to the gap left at the left hand side on shifting a slide plate to the right no visible impression is given of the ratio of the fraction to unity. The second construction is however of greater complexity, higher cost, and owing to the use of springs for the automatic restoration of the slide plates to zero position and for fixing the said plates, also more liable to get out of order, than the first construction. The construction moreover allows only the desired setting of the band from left to right, and not in reverse direction.

Having now described my invention what I claim as new and desire to secure by Letters Patent is:—

1. In a device for teaching fractions, a frame structure, a plurality of parallel horizontal battens, fixed in the frame and numbered at one end from 1 consecutively, a unit length marked off on each batten and divided into as many parts as there are units in the number on the battens, and sliding members under each batten indicating a length the ratio of which to the unit length is the fraction having unity as numerator and the number at the end of the corresponding batten as denominator.

2. In a device for teaching fractions, a frame structure, a plurality of parallel horizontal battens fixed in the frame and numbered at one end from 1 consecutively, a unit length marked off on each batten and divided into as many parts as there are units in the number on the batten, sliding members under each batten indicating a length the ratio of which to the unit length is the fraction having unity as numerator and the number at the end of the corresponding batten as denominator, and cursor plummets adapted to shift along the battens.

3. In a device for teaching fractions a frame structure, a plurality of parallel horizontal battens fixed in the frame and numbered at one end from 1 consecutively, a unit length marked off on each batten and divided into as many parts as there are units in the number on the batten, consecutive figures against each division mark, said figures to correspond to the numerators of fractions, sliding members under the battens indicating a length the ratio of which to the unit length is the fraction having unity as numerator and the number at the end of the corresponding batten as denominator consecutive figures on each sliding member, said figures to correspond to the denominators of fractions, and cursor plummets adapted to shift along the battens.

In testimony whereof I have signed my name to this specification in the presence of two subscribing witnesses.

IRENA PANNENKOWA.

Witnesses:
STANISLAW RITTER VON DZBARISKI,
ZYGMMS SLATOWSKI.

Copies of this patent may be obtained for five cents each, by addressing the "Commissioner of Patents, Washington, D. C."